US006525906B1

(12) United States Patent
Mann et al.

(10) Patent No.: US 6,525,906 B1
(45) Date of Patent: Feb. 25, 2003

(54) MEANS TO PREVENT BUILDUP OF CONTAMINANTS ON THE CAPSTAN OF A MAGNETIC TAPE RECORDER/PLAYER

(76) Inventors: Donald Mann, 3700 Sacramento St., San Francisco, CA (US) 94118; Christine Mann, 3700 Sacramento St., San Francisco, CA (US) 94118

( * ) Notice: Subject to any disclaimer, the term of this patent is extended or adjusted under 35 U.S.C. 154(b) by 54 days.

(21) Appl. No.: 09/722,210

(22) Filed: Nov. 27, 2000

(51) Int. Cl.[7] .......................... G11B 5/10; G11B 5/127; G11B 5/41
(52) U.S. Cl. .................................... 360/128
(58) Field of Search .................. 360/128, 137, 360/110; 369/292

(56) References Cited

U.S. PATENT DOCUMENTS

| | | | | | |
|---|---|---|---|---|---|
| 3,881,195 A | * | 4/1975 | Ono et al. | ................ | 15/256.5 |
| 3,938,752 A | * | 2/1976 | Mann et al. | ................ | 226/183 |
| 4,272,796 A | * | 6/1981 | Van Kreuningen et al. | ................ | 15/210.1 |
| 4,498,115 A | * | 2/1985 | Hofmann | ................ | 360/128 |
| 4,894,743 A | * | 1/1990 | Clausen | ................ | 360/128 |
| 5,021,912 A | * | 6/1991 | Shao-Yung | ................ | 360/128 |
| 5,257,747 A | * | 11/1993 | Mann | ................ | 242/326.1 |
| 5,309,307 A | * | 5/1994 | Fritsch et al. | ................ | 360/128 |
| 5,420,737 A | * | 5/1995 | Clausen | ................ | 360/128 |

* cited by examiner

*Primary Examiner*—William Klimowicz
*Assistant Examiner*—Julie Anne Watko

(57) ABSTRACT

In a standard audio tape cassette, a new method of cleaning the capstan(s) while the tape is playing or recording. The new method and means consists of a fibrous material, generally a felt, which is positioned against the capstan(s) in a way so that when it is in contact it exerts a wiping pressure on the rotating capstan(s). Another means is by positioning the felt on a moveable lever which will bring the felt into contact with the capstan(s) when the cassette is in operating mode and not in contact when the cassette is not operating.

3 Claims, 3 Drawing Sheets

MEANS TO PREVENT BUILDUP OF CONTAMINANTS ON THE CAPSTAN OF A MAGNETIC TAPE RECORDER/PLAYER

DESCRIPTION OF THE INVENTION

The simple mechanical tape transport of a recorder/player consists of a motor, a magnetic head, a pinch roller assembly and capstan.

Figure 1:
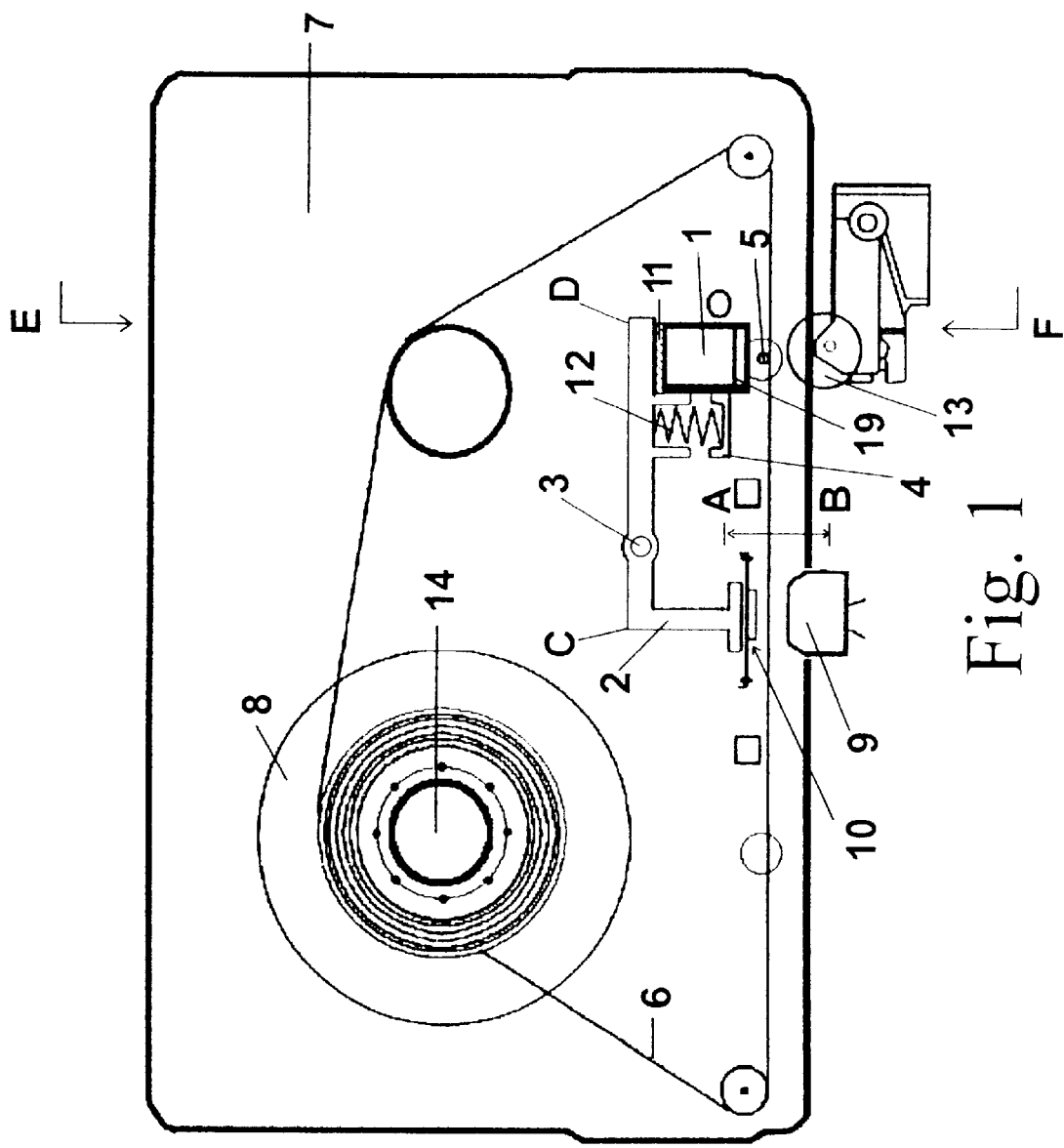

In an audiotape endless loop cassette which fits into a tape recorder/player this invention of a new cassette which combines the play/record function with rotating capstan cleaning is described in the following drawings: in FIG. 1, a tape platform and conical hub 8 which is free to rotate around boss 14 which is molded into the bottom half of the cassette housing 7, which consists of a bottom half and a top half. A magnetic tape head 9 opposed to a flat spring and felt pad assembly 10 which when engaged pushes the tape 6 against the magnetic head 9 which receives or plays recorded signals from the magnetic oxide on the magnetic tape 6; when the magnetic head 9 exerts pressure on the spring-felt pad assembly 10, the pinchroller 13 pushes against the oxide surface of the tape 6 squeezing the tape 6 against the capstan 5 which drives the tape 6 when it is rotating aginst the graphite surface of the tape 6; in operation, the magnetic head 9 moves from position B in the direction of A which pushes the spring-pad assembly 10 against one end of the lever 2 which then pivots on fulcrum 3 moving the corner C in a direction away from the front of the cassette housing 7 and the corner D is moved towards the front of the cassette housing 7; the movement of corner D compresses the spring 12 which is positioned between lever 2 and a spring retaining support 4 which serves to move the lever 2 to a non-operating position with respect to the front of the cassette housing 7 when the magnetic head 9 and the pinchroller 13 are not squeezing the tape 6 and the endless loop cassette is not operating; a cleaning felt 1 is attached to the lever 2 at the D corner by means of an adhesive 11; the movement of lever 2 when operational causes the corner D to move in the direction toward the front of the cassette housing 7 and pushes the cleaning felt 1 against the capstan 5 which is rotating during play or record. In felt 1, on the top surface is a notch 19 having a flat portion and a vertical sidewall. When the top half of the cassette 7 is mated with the bottom half, a structural rib abuts the vertical wall of the notch 19 which serves the purpose of preventing the central part 20 of the felt 1 which wipes the capstan clean, from exerting to much pressure on the capstan 5 which might tend to be a resistance and lower the rotation speed or put excess load on the motor. Singular to this invention is the new capability of cleaning at the same time that the tape transport is in play or record mode. This new cassette simultaneously cleans the rotating capstan while playing or recording which is free to rotate around boss 14 which is molded into the bottom half of the cassette housing 7 which consists of a bottom half and a top half. A magnetic tape head 9 opposed to a flat spring and felt pad assembly 10 which when engaged pushes the tape 6 against the magnetic head 9 which receives or plays recorded signals from the magnetic oxide on the tape 6; when the magnetic head 9 exerts pressure on the spring-pad assembly 10, the pinchroller 13 pushes against the oxide surface of the tape squeezing the tape 6 against the capstan 5 which drives the tape 6 when it is rotating against the graphite surface of the tape 6; in operation, the magnetic head 9 moves from position D in the firection of A which pushes the spring-pad assembly 10 moving the comer C in a direction toward the back of cassette housing 7 and the corner D is moved toward the front of the cassette housing 7; the movement of corner D compresses the spring 12 which is positioned between lever 2 and a spring retaining support 4 which serves to move the lever 2 to a non-operating position with respect to the front of the cassette housing 7 when the magnetic head 9 and the pinchroller 13 are not squeezing the tape 6 and the endless loop cassette is not operating; a cleaning felt 1 is attached to the lever 2 at the D comer by means of an adhesive 11; the movement of lever 2 when operational causes the corner D to move in the direction toward the front of the cassette housing 7 and pushes cleaning felt 1 against the capstan 5 which is rotating during operation. The new cassette simultaneously cleans the rotating capstan while playing or recording which is an improvement over previous cassettes whose function is cleaning only.

Figure 2:
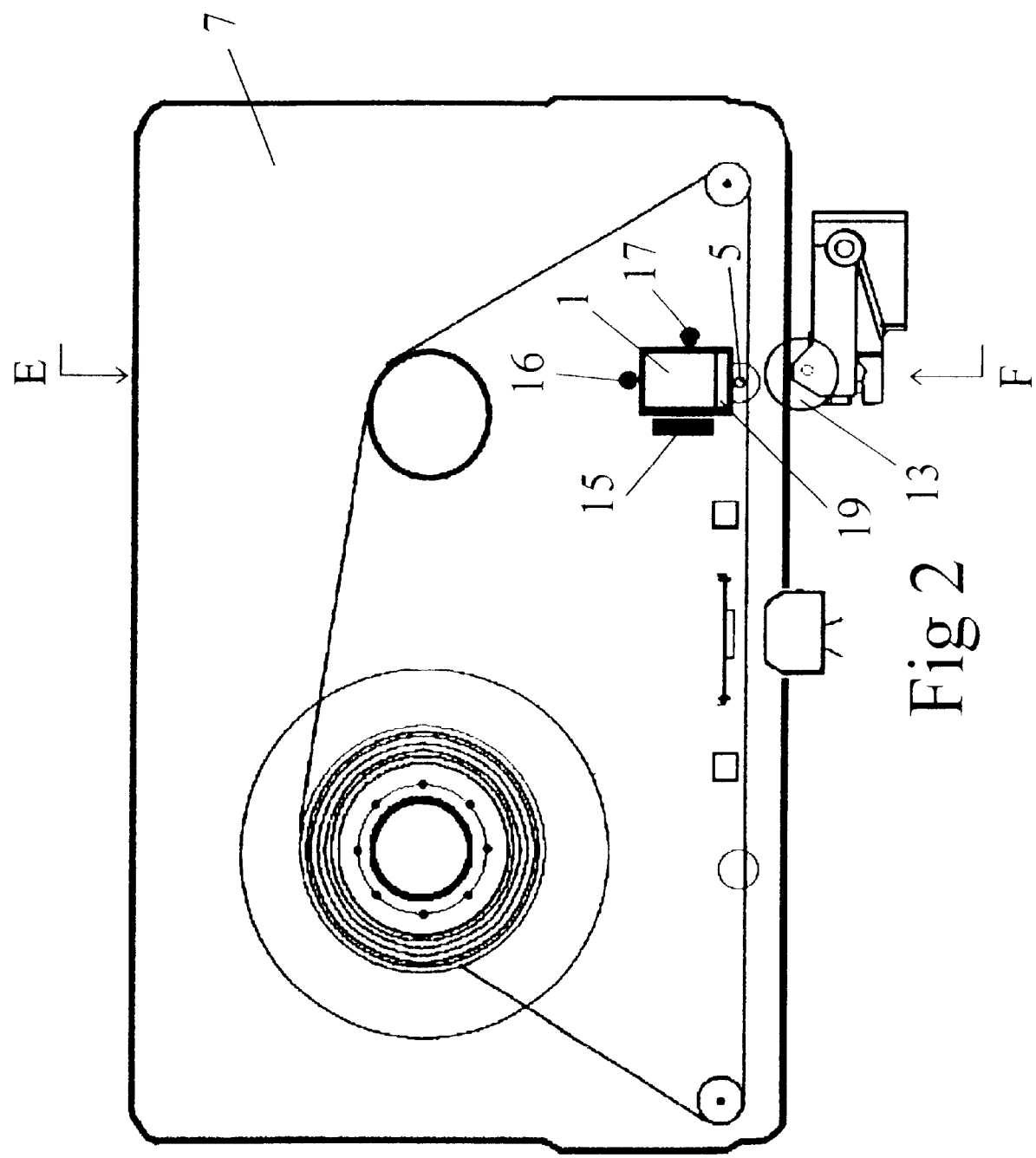

In FIG. 2 another mode of operation is described in which the cleaning felt 1 is held in position inside the cassette housing 7 by positioning-pin support member 16, and 17 and sidewall support member 15 which are on three sides of felt 1 so that the fourth side is in contact with capstan 5. When the bottom half of cassette housing 7 is mated with the top half (not shown) the felt 1 is enclosed on all sides and from top to bottom which secures it in a fixed position.

Figure 3:
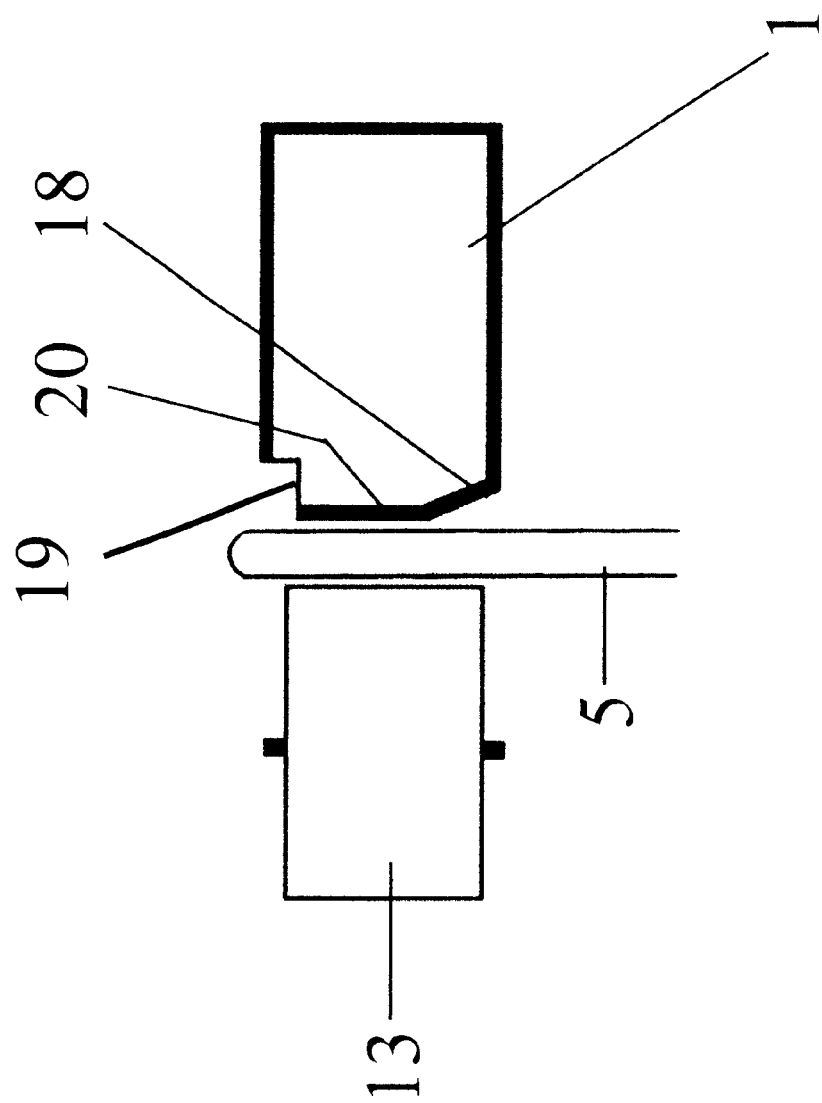

FIG. 3 is a cross section along the lines E–F showing the pinchroller 1 and felt 1 in contact with capstan 5, an angle 18 created by a bottom cut being in the range of 45 to 65 degrees being on the front bottom portion of felt 1, a central flat portion 20 abuts the capstan 5 performing the cleaning function.

Having described my invention of an endless loop tape cassette with my best mode of positioning and using a felt to clean the capstan in the tape transport in an audiotape recorder or player, it is my intention that the scope of this invention shall not be limited to the specific embodiments in the specification and shown in the drawings but to include such other embodiments as would occur to one skilled in the art using the same invention principle.

I claim:

1. A capstan cleaning system in an audiotape cassette comprising an endless loop of audiotape, a felt, a lever, a pre-existing enclosure space, wherein said cassette comprises means for positioning said lever against said felt enclosed in said pre-existing enclosure space, said felt having a top portion, a bottom portion and a central portion, said central portion being flat, said top portion having a notch, said bottom portion being cut at an angle in the range of 45 to 64 degrees.

2. A capstan cleaning system comprising a capstan in a recorder/player tape transport, the audiotape cassette of claim 1, wherein said felt is moveably adherent to said capstan by means of said felt being responsive to movement of said lever, wherein said lever moves responsive to a movement of a record/play head of a recorder/player, wherein said movement of said record/play head is responsive to a record or play control button.

3. A capstan cleaning system in an audio tape cassette comprising an endless loop of audio tape, a felt, a preexisting enclosure space, within said cassette comprises means for positioning felt enclosed in said pre-existing enclosure space, said felt having a top portion, a bottom portion and a central portion, said central portion being flat, said top portion having a notch, said bottom portion being cut forming a capstan deflection angle in the range of 45 to 65 degrees.

* * * * *